(12) United States Patent
Blanchette et al.

(10) Patent No.: US 10,962,185 B2
(45) Date of Patent: Mar. 30, 2021

(54) ILLUMINATED SUPPORT STAND

(71) Applicants: Paul K. Blanchette, Salem, NH (US); Madison E. Shipka, Burlington, MA (US); Andrew T. Miller, Wilmington, MA (US); Matthew D. Canadas, Billerica, MA (US); Brayden N. Taylor, Billerica, MA (US)

(72) Inventors: Paul K. Blanchette, Salem, NH (US); Madison E. Shipka, Burlington, MA (US); Andrew T. Miller, Wilmington, MA (US); Matthew D. Canadas, Billerica, MA (US); Brayden N. Taylor, Billerica, MA (US)

( * ) Notice: Subject to any disclaimer, the term of this patent is extended or adjusted under 35 U.S.C. 154(b) by 36 days.

(21) Appl. No.: 16/040,610

(22) Filed: Jul. 20, 2018

(65) Prior Publication Data

US 2019/0145594 A1 May 16, 2019

Related U.S. Application Data

(60) Provisional application No. 62/586,744, filed on Nov. 15, 2017.

(51) Int. Cl.
| | |
|---|---|
| *F21S 10/06* | (2006.01) |
| *F21V 23/04* | (2006.01) |
| *F21S 9/02* | (2006.01) |
| *F21S 10/02* | (2006.01) |
| *F21V 23/02* | (2006.01) |

(Continued)

(52) U.S. Cl.
CPC ................ *F21S 10/06* (2013.01); *A47G 7/04* (2013.01); *F21S 9/02* (2013.01); *F21S 10/023* (2013.01); *F21V 23/02* (2013.01); *F21V 23/0407* (2013.01); *F21V 23/0435* (2013.01); *F21V 23/0442* (2013.01); *F21V 33/0028* (2013.01); *H05B 47/12* (2020.01); *H05B 47/19* (2020.01); *A47G 2200/08* (2013.01); *F21W 2121/00* (2013.01); *F21Y 2103/33* (2016.08); *F21Y 2105/18* (2016.08); *F21Y 2113/10* (2016.08);

(Continued)

(58) Field of Classification Search
CPC .......... F21S 10/02; F21S 10/06; F21S 10/023; A47G 7/04; H05B 47/12; F21V 23/0407
See application file for complete search history.

(56) References Cited

U.S. PATENT DOCUMENTS

| | | |
|---|---|---|
| 4,616,304 A | 10/1986 | Kohorn |
| 4,847,736 A | 7/1989 | Ho |

(Continued)

*Primary Examiner* — Karabi Guharay
(74) *Attorney, Agent, or Firm* — Boudwin Intellectual Property; Daniel Boudwin

(57) ABSTRACT

An illuminated support stand having a housing with a base and at least one sidewall forming an interior volume. The illuminated support stand also has an upper planar surface with a transparent portion centrally disposed thereon. A light source is disposed beneath the transparent portion within the interior volume of the base. The upper planar surface is configured to support an object, such as a vase thereon with a plurality of light-emitting diodes (LEDs) configured to flash in sequence with an audio input. A plurality of control buttons is disposed on an outer front surface of the housing and is used to operate the illuminated support stand. A wireless transceiver is configured to connect to an external source. A skirt is disposed on a perimeter of the housing and is removably secured thereon.

1 Claim, 5 Drawing Sheets

(51) Int. Cl.
  *F21V 33/00* (2006.01)
  *A47G 7/04* (2006.01)
  *H05B 47/12* (2020.01)
  *H05B 47/19* (2020.01)
  *F21W 121/00* (2006.01)
  *F21Y 115/10* (2016.01)
  *F21Y 113/10* (2016.01)
  *F21Y 105/18* (2016.01)
  *F21Y 113/13* (2016.01)
  *F21Y 103/33* (2016.01)
  *H05B 45/00* (2020.01)

(52) U.S. Cl.
  CPC ........ *F21Y 2113/13* (2016.08); *F21Y 2115/10* (2016.08); *H05B 45/00* (2020.01)

(56) References Cited

U.S. PATENT DOCUMENTS

| | | | |
|---|---|---|---|
| 4,980,807 A | | 12/1990 | Kohorn |
| 5,052,263 A | * | 10/1991 | Feng ........................ A63H 5/04 84/464 R |
| 7,458,698 B2 | | 12/2008 | Heathcock et al. |
| 7,821,380 B1 | * | 10/2010 | Grote, Jr. ............. B60Q 1/2611 340/384.4 |
| 2009/0323318 A1 | | 12/2009 | Chan |
| 2018/0160975 A1 | * | 6/2018 | London ................. A61B 5/1118 |

* cited by examiner

US 10,962,185 B2

ILLUMINATED SUPPORT STAND

CROSS REFERENCE TO RELATED APPLICATIONS

This application claims the benefit of U.S. Provisional Application No. 62/586,744 filed on Nov. 15, 2017. The above identified patent application is herein incorporated by reference in its entirety to provide continuity of disclosure.

BACKGROUND OF THE INVENTION

When decorating, many people use lighting to showcase certain elements within the space. In many instances, elements such as plants or vases have a more appealing appearance when used in connection with lighting. Thus, decorators will illuminate a plant or vase to make it stand out within the room. However, in most instances, the light used to illuminate the plant is only one specific color and does not change or flash. Furthermore, typical lights do not have the capability to sync flashing with the sound of music. Therefore, a system that can illuminate a vase with a variety of colors while syncing the lights to music is needed.

Devices have been disclosed that relate to illuminated support stands. These include devices that have been patented and published in patent publications. These devices generally relate to a plant stand that illuminates flowers or a vase. However, these devices fail to disclose an illuminated support stand that illuminates the inside of a vase with LED lights that flash in a pattern corresponding to a received audio input via wireless communication.

SUMMARY OF THE INVENTION

In view of the foregoing disadvantages inherent in the known art it is submitted that the present invention substantially diverges in design elements from the known art and consequently it is clear that there is a need in the art for an improvement to existing illuminated support stand devices. In this regard the instant invention substantially fulfills these needs.

It is therefore an object of the present invention to provide a new and improved illuminated support stand.

It is another object of the present invention to provide an illuminated support stand having a housing comprising a base with at least one sidewall forming an interior volume and an upper planar surface having a transparent portion centrally disposed thereon.

Another object of the present invention is to provide an illuminated support stand wherein a light source is disposed beneath the transparent portion within the interior volume of the base with a plurality of light-emitting diodes (LEDs) configured to flash in sequence with an audio input from an outside source, such as a Bluetooth signal.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
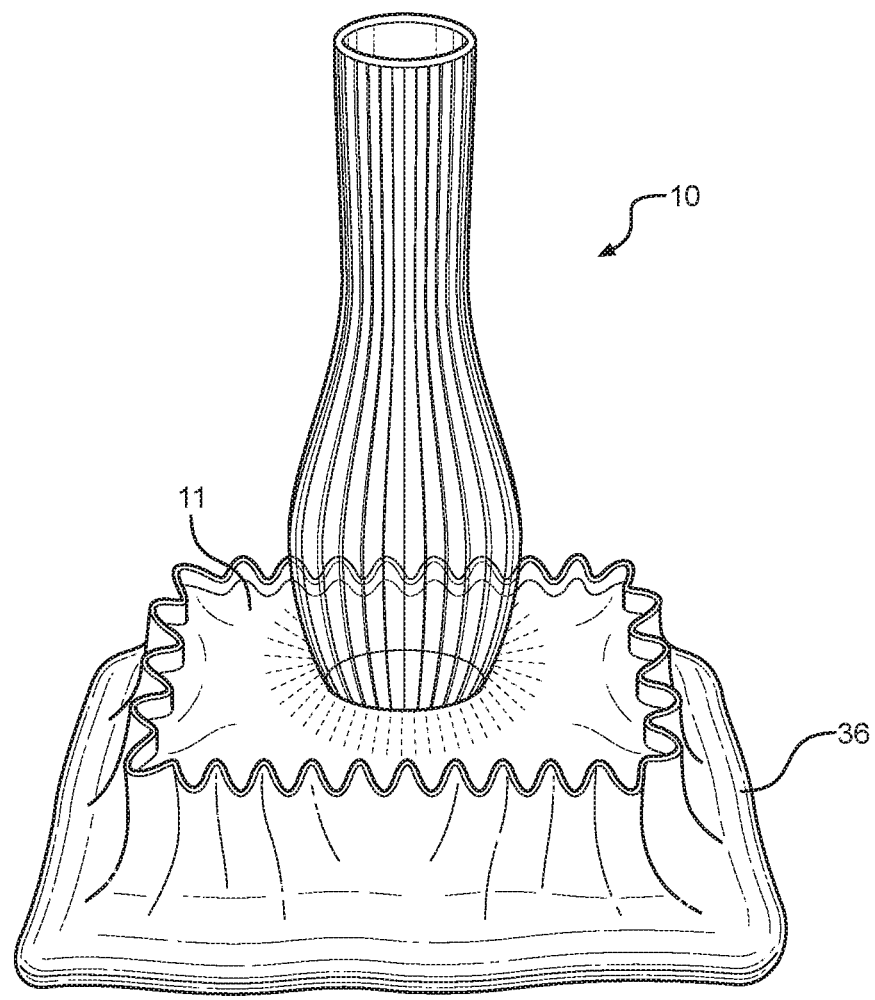
FIG. 1 shows a perspective view of an embodiment of the illuminated support stand in use.

Reference is made herein to the attached drawings. Like reference numerals are used throughout the drawings to depict like or similar elements of the illuminated support stand. The figures are intended for representative purposes only and should not be considered to be limiting in any respect.

Figure 2:
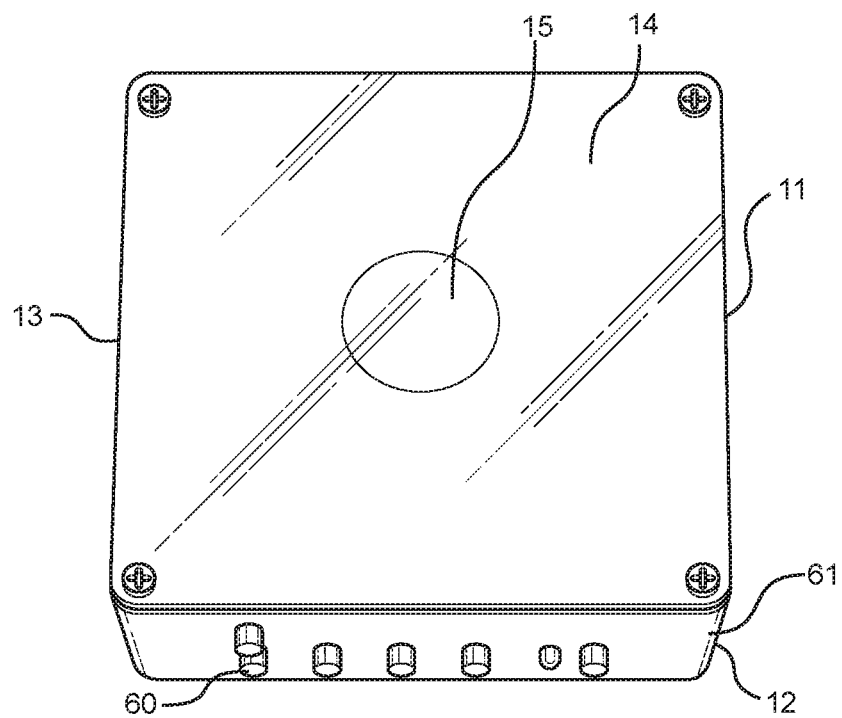
FIG. 2 shows a top perspective view of an embodiment of the illuminated support stand.

Referring now to FIG. 1 and FIG. 2, there is shown a perspective view of an embodiment of the illuminated support stand in use and a top perspective view of an embodiment of the illuminated support stand, respectively. The illuminated support stand 10 is comprised of a housing 11 with a base 12 having at least one side wall 13 and an upper planar surface 14 having a transparent portion 15 centrally disposed thereon. The base 12 and side walls 13 are made of a hard, plastic material, such as a high-density polyethylene or an acrylic material and may be secured to one another in any suitable manner, such as with nails or screws. In some embodiments, the entire upper planar surface 14 is comprised of a transparent, hard material, such as polystyrene to allow light to pass therethrough, while in alternate embodiments, the transparent portion 15 comprises a surface area less than that of the upper planar surface 14, allowing a user to focus light on a central object. In an alternate embodiment, the upper planar surface 14 about the transparent portion 15 comprises a translucent material, such that light is diffused therethrough, allowing various aesthetic lighting effects to be used. The upper planar surface 14 is further configured to support an object such as a vase. In some embodiments, the illuminated support stand 10 comprises a kit including an object, wherein the object is made of a transparent material, such as glass, such that the user can achieve a desired aesthetic lighting effect as the light is diffused through the object.

The sidewalls 13 of the housing 11 are secured to the base 12 of the housing 11 in any suitable manner, such as with nails or screws. In the illustrated embodiments, the housing 11 is shaped as a square; however, in alternate embodiments, the shape of the housing 11 can be in any suitable form, such as a circle or a rectangle. The illuminated support stand 10 is further comprised of a plurality of control buttons 60, wherein the control buttons 60 are disposed on an outer front surface 61 of the illuminated support stand 10. The illuminated support stand 10 is also comprised of a skirt 36 that is removably secured to the housing 11 wherein the skirt is disposed around the perimeter of the housing 11 and is used for decorative purposes. In some embodiments, the skirt 36 is comprised of a cloth-like material or another soft material with an elastic trim to secure the skirt 36 to the housing 11.

Figure 3:
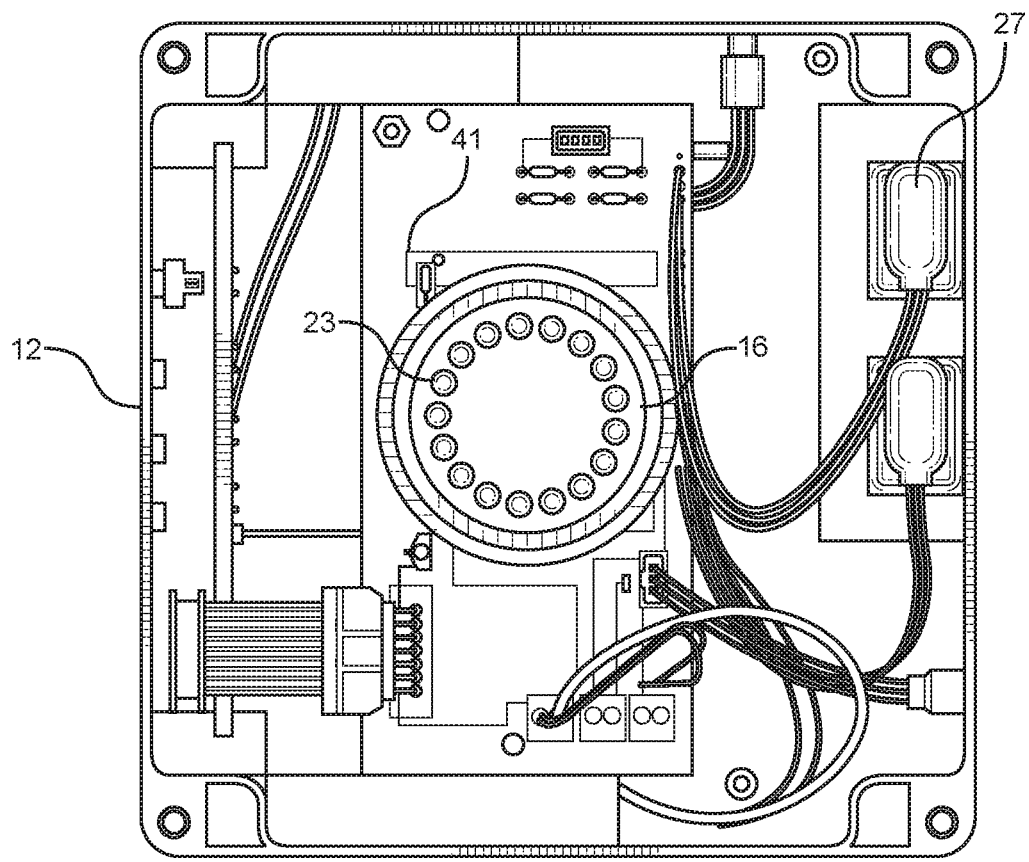
FIG. 3 shows a top cut-away view of an embodiment of the illuminated support stand.
Figure 4:
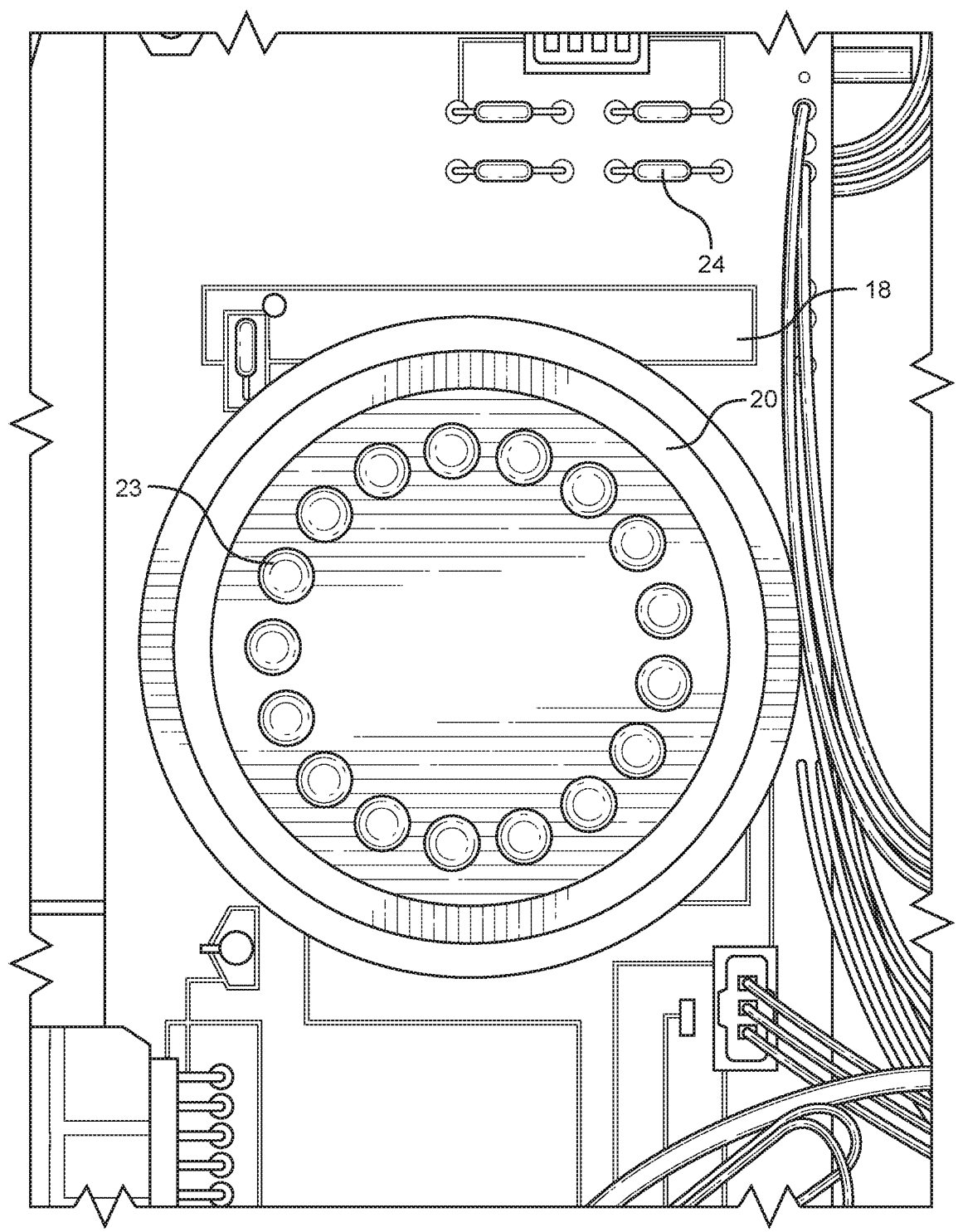
FIG. 4 shows a close-up view of the LEDs of an embodiment of the illuminated support stand.

Referring now to FIGS. 3 and 4, there is shown a top cut-away view of an embodiment of the illuminated support system and a close-up view of the LEDs of an embodiment of the illuminated support stand, respectively. In the illustrated embodiment, a light source 16 is disposed beneath the upper planar surface within the interior volume of the base 12 wherein the light source is comprised of light emitting diodes (LEDs) 23 operably connected to a circuit board 41. In the illustrated embodiment, the circuit board 41 is comprised of a main board 20 configured to activate the LEDs 23; a Bluetooth receiver board 18 configured to receive a Bluetooth signal from an outside Bluetooth transmitter signal; and a switch board 24 that is operably connected to the plurality of control buttons. The circuit board 41 further comprises a power source 27 operably connected to the light source, wherein the power source 27 is a battery or an adapter.

In the illustrated embodiment of FIG. 4, the LEDs 23 are disposed on the main board 20 in a circular pattern wherein there are a total of sixteen LEDs 23 with four LEDS 23 per color. For example, there are four yellow LEDs, four red LEDs, four blue LEDs and four white LEDs, 23 wherein the LEDS are configured to selectively display the corresponding light color when engaged by a user via the plurality of control buttons 60. In some embodiments, the illuminated support stand further comprises a gasket disposed about the perimeter of the light source, the gasket configured to block out ambient light and channel light through the transparent portion of the upper planar surface.

Figure 5:
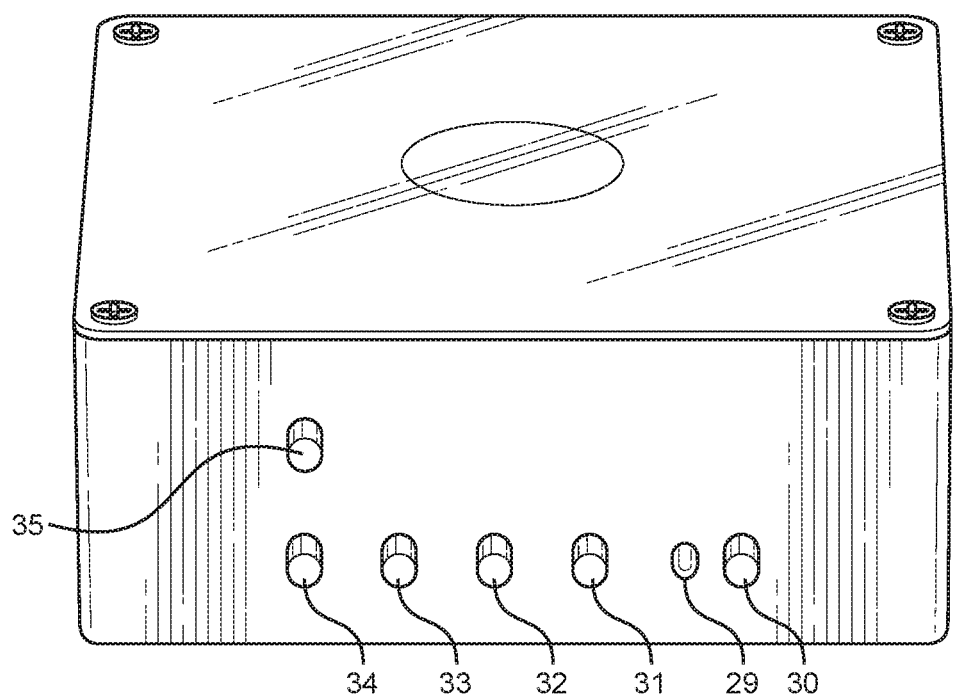
FIG. 5 shows a perspective view of an embodiment of the illuminated support stand.

Referring now to FIG. 5 there is shown a perspective view of an embodiment of the illuminated support stand. In the illustrated embodiment, the outer front surface is comprised of the plurality of control buttons wherein the controls buttons are comprised of a red light control button 34, a yellow light control button 33, a blue light control button 32, and a white light control button 31, respectively. The plurality of control buttons are selectively activated by a user and are configured to display at least one color if at least one control button is selected. A user can also select a combination of colors to create a different color. For example, if the user selects the red light control button 34 and the white light control button 31, the resulting color illuminated in the vase would be a combination of the two colors. In the illustrated embodiment, the outer front surface further comprises a constant button 35 wherein the constant button 35 is configured to display one selected color through the intended object at a steady, non-flashing rate. For example, the user selects the yellow light control button 33 and the constant button 35 simultaneously; only the yellow light is displayed through the intended object in a steady stream. The constant button 35 is further configured to disable a wireless signal from an outside source, such as a mobile device. In some embodiments, the wireless signal comprises a Bluetooth signal. For example, if a user selects the constant button 35 while receiving a wireless signal and the lights are flashing in time with the wireless signal, the lights will stop flashing when the constant button 35 is selected. A power button 30 is configured to selectively activate and deactivate the illuminated support stand. The outer front surface further comprises an on/off indicator light 29, wherein the indicator light 29 is configured to display a red light when the illuminated support stand is on and no light when the illuminated support stand is off.

Figure 6:
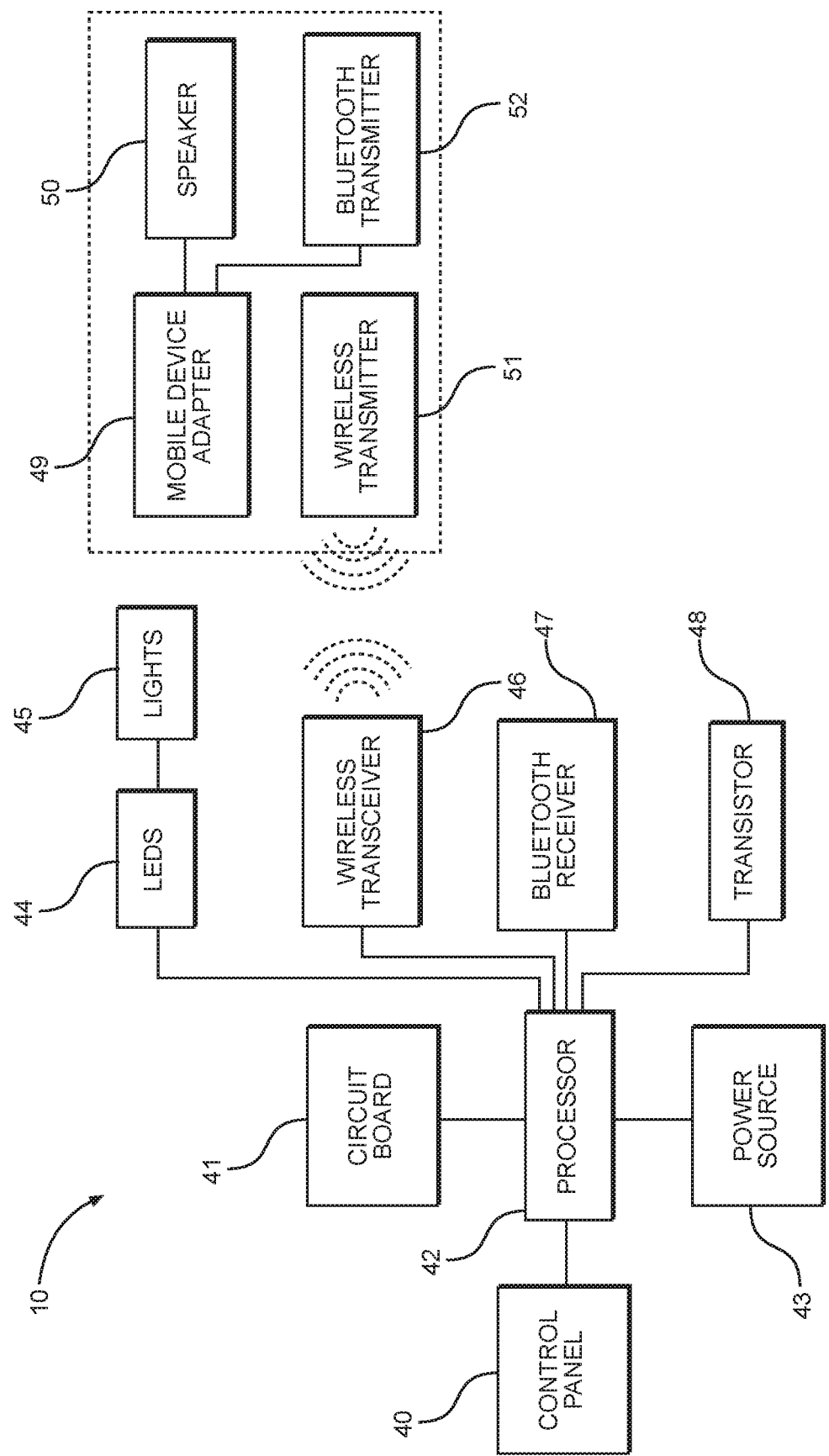
FIG. 6 shows a block diagram of an embodiment of the illuminated support stand.

Referring now to FIG. 6, there is shown a block diagram of an embodiment of the illuminated support stand. The control panel 40 is comprised of a microprocessor 42 having a power source 43 and the circuit board 41. The control panel 40 further comprises a wireless transceiver 46 adapted to allow the illuminated support stand to wirelessly communicate with a user's mobile device via a mobile device adapter 49. In the illustrated embodiment, the control panel 40 also comprises a Bluetooth receiver 47 adapted to receive a signal emitted from a Bluetooth transmitter 52 from an outside source, such as a mobile phone or Bluetooth-enabled speakers 50. The control panel 40 further comprises a transistor 48 wherein the transistor 48 is adapted to enable the LEDs 23 to pulse and flash in synchronization with a musical beat from an outside source. In some embodiments, the musical beat is indicated by a wireless audio signal input received by the wireless transceiver 46, wherein the wireless audio signal input is modulated to include data indicating the musical beat, which is then translated by the illuminated support stand 10 to illuminate the light source in time with the audio signal input. Alternatively, in some embodiments, the audio signal input comprises an audible signal emitted via the speakers 50 and received by a microphone disposed on the housing. In this way, the illuminated support stand 10 can directly respond to the music being played from the speaker 50.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An illuminated support stand, consisting of:
   a housing having a base;
   a plurality of sidewalls forming an interior volume;
   an upper planar surface having a transparent portion centrally disposed thereon;
   a light source disposed beneath the transparent portion within the interior volume of the base;
   the upper planar surface is configured to support an object thereon;
   wherein the light source is configured to flash in sync with an audio signal input;
   a plurality of control buttons disposed on an outer front surface of the housing being used to operate the illuminated support stand; and
   a wireless transceiver configured to wirelessly communicate with an external source.

* * * * *